United States Patent [19]

Silverwater

[11] Patent Number: 4,688,433
[45] Date of Patent: Aug. 25, 1987

[54] FLOW SENSING DEVICE
[75] Inventor: Bernard Silverwater, Plainview, N.Y.
[73] Assignee: Pall Corporation, Glen Cove, N.Y.
[21] Appl. No.: 755,020
[22] Filed: Jul. 15, 1985
[51] Int. Cl.$^4$ ............. G01F 1/22; G01F 1/40
[52] U.S. Cl. ................. 73/861.53; 138/43; 138/45
[58] Field of Search ......... 73/861.53, 861.71, 861.74; 137/854; 138/43, 45, 46

[56] References Cited

U.S. PATENT DOCUMENTS

| | | |
|---|---|---|
| 280,212 | 6/1883 | Miles ................... 137/854 |
| 2,035,472 | 3/1936 | Hammond . |
| 2,444,677 | 7/1948 | Rosenblum . |
| 2,489,932 | 11/1949 | Rosenblum . |
| 2,777,464 | 1/1957 | Mosely . |
| 2,850,897 | 9/1958 | Main et al. ............ 73/861.53 |
| 2,873,104 | 2/1959 | Horwood . |
| 2,941,544 | 6/1960 | Peras ................... 138/45 |
| 2,989,866 | 6/1961 | Widell et al. . |
| 3,232,288 | 2/1966 | Krobath . |
| 3,403,556 | 10/1968 | Koester . |
| 3,483,733 | 12/1969 | Hinderer . |
| 3,592,302 | 7/1971 | Allinquant ............ 137/854 |
| 3,795,145 | 3/1974 | Miller . |
| 3,857,277 | 12/1974 | Moore ................. 73/861.74 |
| 3,989,037 | 11/1976 | Franetzki . |
| 4,006,634 | 2/1977 | Billette . |
| 4,083,245 | 4/1978 | Osborn . |
| 4,375,169 | 3/1983 | Torresin ............... 73/861.53 |
| 4,535,820 | 8/1985 | Raines ................. 137/854 |
| 4,552,027 | 11/1985 | Larner ................. 73/861.53 |

FOREIGN PATENT DOCUMENTS 2282108  3/1976  France ............... 73/861.74

OTHER PUBLICATIONS

McGraw-Hill Encyclopedia of Science & Technology 1982, vol. 1, pp. 464–475.

Primary Examiner—Herbert Goldstein
Attorney, Agent, or Firm—Leydig, Voit & Mayer

[57] ABSTRACT

A device for sensing fluid flow comprising a housing having an inlet and an outlet and defining a fluid flow channel between the inlet and the outlet, a first member disposed in the fluid flow channel and including at least one rigid portion, and a second member disposed in the fluid flow channel upstream from the first member and including at least one flexible portion, said flexible portion being elastically flexible between an initial position spaced from the rigid portion and with its periphery generally spaced from the periphery of the channel to define a first effective flwo area and a final position adjacent the rigid portion and with its periphery generally spaced from the periphery of the channel to a second effective flow area which exceeds the first effective flow area.

16 Claims, 3 Drawing Figures

FLOW SENSING DEVICE

TECHNICAL FIELD

The present invention relates to devices for sensing the flow of a fluid. In particular, it relates to flow sensing devices which develop a differential pressure in response to fluid flow.

DISCLOSURE OF THE INVENTION

Fluid is a generic term which encompasses both liquids and gases. Flow may be defined as the volume of fluid passing a location in a certain amount of time and may be expressed in terms such as gallons per minute or cubic feet per second. For many mechanical and chemical systems, it is important to be able to accurately sense fluid flow at some point in the system.

Many devices for sensing fluid flow are commonly available. For example, one type of device includes a rigid flow obstruction, such as a rigid plate with a hole in it, located within a pipe. The diameter of the hole is smaller than the inside diameter of the pipe. In accordance with certain physical laws, the pressure of the fluid flowing through the flow obstruction is less than the pressure of the fluid flowing through the larger diameter pipe upstream from the flow obstruction. The difference between these two pressures is known as the differential pressure and the value of the differential pressure is related to the flow, i.e., a large flow yields a large differential pressure while a small flow yields a small differential pressure. Typically, this type of device further includes an arrangement for sensing the differential pressure, relating the differential pressure to the flow, and displaying the value of the flow.

While flowing sensing devices with rigid flow obstructions are effective and reliable, they nonetheless have several undesirable characteristics. For example, due to the relationship between flow and differential pressure in these devices, low flows are difficult to accurately sense. Consequently, the range of flows which these devices can usefully sense is rather small, e.g., the maximum flow may be only about 3 to 4 times the minimum flow.

A general object of the present invention is to provide an improved flow sensor. Specific objects include providing a flow sensor which has a wide flow range and yet is extremely reliable and effective.

In accordance with the invention, a flow sensing device is provided which comprises a housing which has an inlet and an outlet and defines a fluid flow channel between them, a first member which is disposed in the fluid flow channel and includes at least one rigid portion, and a second member which is disposed in the fluid flow channel upstream from the first member and includes at least one flexible portion. The flexible portion is elastically flexible between an initial position spaced from the rigid portion and with its periphery generally spaced from the periphery of the channel to define a first effective flow area within the channel and a final position adjacent the rigid portion and with its periphery generally spaced from the periphery of the channel to define a second effective flow area within the channel which exceeds the first effective flow area. At low flows, the flexible portion flexes elastically from its initial position, generating a differential pressure which allows the low flow greater than a predetermined velocity, to be accurately sensed. At high flows, the flexible portion is maintained securely against the rigid portion, allowing the high flow to be accurately sensed. Consequently, the flow range for the flow sensing device of the present invention is much larger than many conventionally available devices.

BEST MODE FOR CARRYING OUT THE INVENTION

Figure 1:
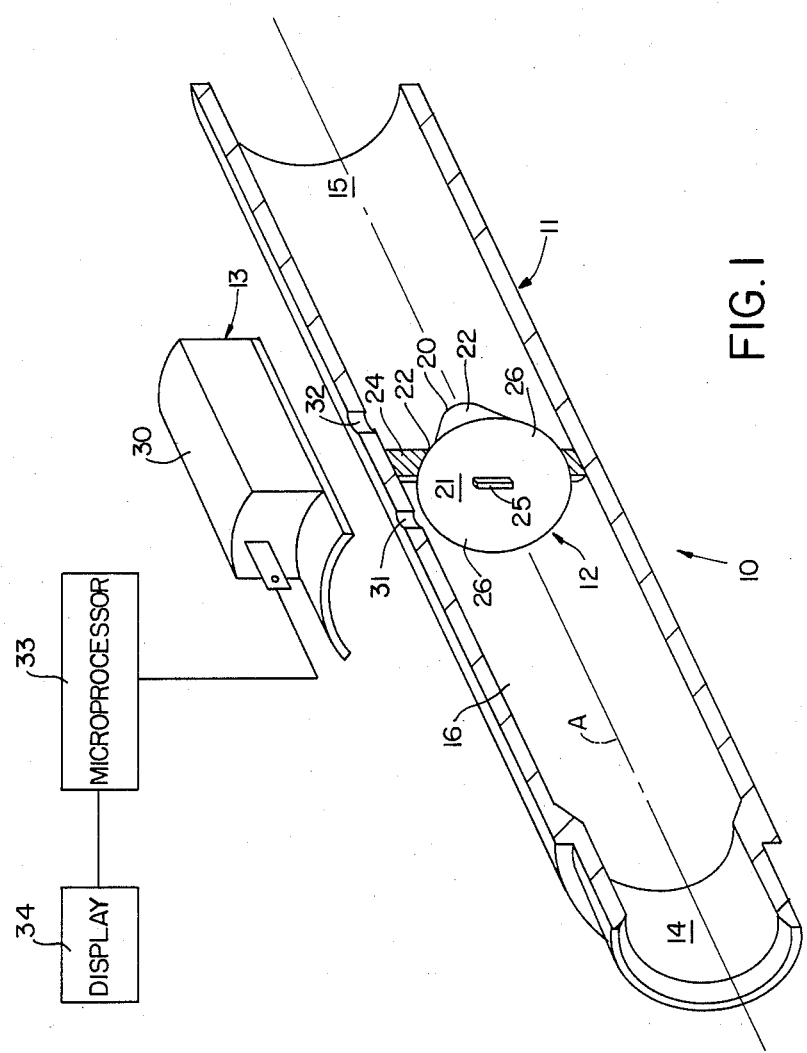
FIG. 1 is a partially sectional, partially exploded, and partially schematic perspective view of a first exemplary flow sensing device embodying the invention.
Figure 2:
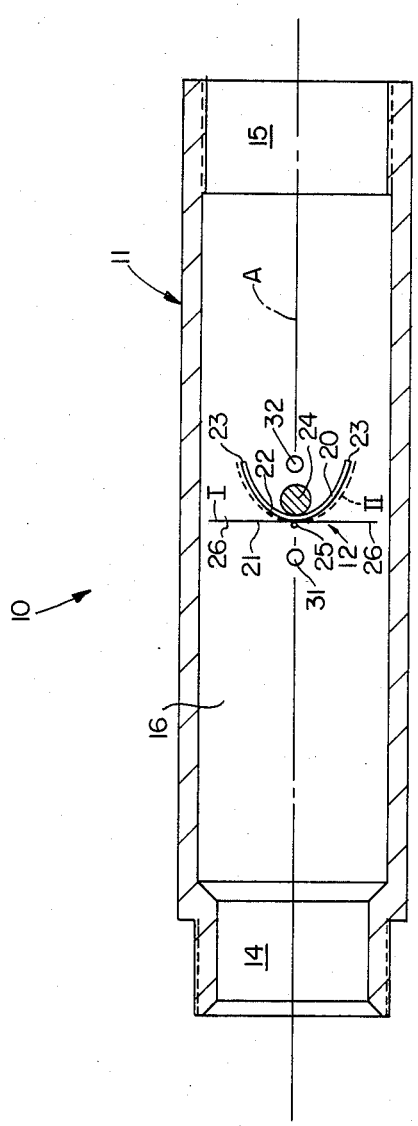
FIG. 2 is a sectional bottom view of the flow sensing device of FIG. 1.

As shown in FIGS. 1 and 2, a first exemplary flow sensing device 10 constructed and operated according to the present invention generally comprises a housing 11, a flow obstruction assembly 12, and a pressure sensing arrangement 13. The housing 11 has an inlet 14 and an outlet 15 and defines a fluid flow channel 16 between the inlet 14 and the outlet 15. While the housing may be fabricated from any suitably impervious material and fashioned in any appropriate configuration, the housing 11 of the first exemplary flow sensing device 10 is fabricated from aluminum and fashioned in a generally cylindrical configuration. Further, although the flow channel may be variously configured, the flow channel 16 of the first exemplary flow sensing device 10 extends coaxially between the inlet 14 and the outlet 15 and has a uniform, circular cross section. Consequently, the general direction of fluid flow through the channel 16 is parallel to the channel axis A.

The flow obstruction assembly 12 is mounted to the housing 11 in the fluid flow channel 16 and, in accordance with one aspect of the invention, generally includes a rigid member 20 disposed downstream from a flexible member 21. Although the flow obstruction assembly may assume any suitable configuration, in the exemplary flow sensing device 10, the rigid member 20 comprises a plate having a generally U-shaped cross section while the flexible member 21 comprises a thin circular disc. The thinness of the flexible member 21 may be uniform or non-uniform, e.g., may taper toward the edge.

The rigid member 20, which may be fabricated from aluminum, is preferably mounted symmetrically within the flow channel 16 with the bight 22 of the U-shaped rigid member 20 lying generally normal to the direction of flow and the legs 23 extending downstream oblique to the direction of flow. The rigid member 20 may be fixed within the flow channel 16 by any appropriate means, e.g., by welding the rigid member 20 to the housing 11. In the first exemplary flow sensing device 10, the rigid member 20 is attached to a pin 24. The pin 24 is attached at both ends to the housing 11 and extends along the downends stream side of the bight 22 perpendicularly through the channel axis A.

The thin circular disc of the flexible member 21 preferably is fashioned from stainless steel and has a diameter somewhat less than the inside diameter of the housing 11. The diameter and thinness of the flexible disc member 21 may be selected to yield a desired response to flow, thinner and larger diameter members 21 being more responsive to lower flows. The flexible disc member 21 of the first exemplary flow sensing device 10 is preferably mounted coaxially within the channel 16 normal to the direction of flow and proximate the rigid member 20. For example, the flexible member 21 may be joined to the bight 22 of the rigid member 20 by a staple 25 which extends through the rigid member 20 into the pin 24, fixing the rigid member 20 to the pin 24 as well. The wings 26 of the flexible disc member 21, i.e., the portions of the flexible disc member 21 away from the bight 22 of the rigid member 20, remain free to flex between an initial position I normal to the direction of flow and a final position II adjacent the legs 23 of the rigid member 20.

The pressure sensing arrangement 13 may comprise any suitable, well-known pressure transducer capable of sensing a differential pressure within the flow channel 16 caused by the flow obstruction assembly 12 and providing an electrical signal which corresponds to the differential pressure. For example, in the first exemplary flow sensing device 10, the pressure sensing arrangement 13 may include a conventional pressure transducer 30 mounted to the outside of the housing 11 and two apertures 31, 32 in the housing 11 which allow fluid pressure to be communicated between the channel 16 and the pressure transducer 30. The first aperture 31 is located upstream from the flow obstruction assembly 12, preferably slightly ahead of the flexible member 21 and in the plane defined by the channel axis A and the pin 24.

The second aperture 32 may be located in various locations near the flow obstruction assembly 12 where the pressure drops due to fluid flow around the obstruction assembly 12. In the first exemplary flow sensing device 10, the second aperture 32 is preferably disposed slightly behind the pin 24 but in the same plane and on the same side of the housing 11 as the first aperture 31. The pressure transducer 30 may be connected to any conventional device for correlating the differential pressure with the flow and displaying the flow. For example, the electrical signal output by the pressure transducer 30 may be supplied to a microprocessor 33 which correlates the signal with the appropriate flow and drives a display 34, such as an LED display, to indicate the flow.

Figure 3:
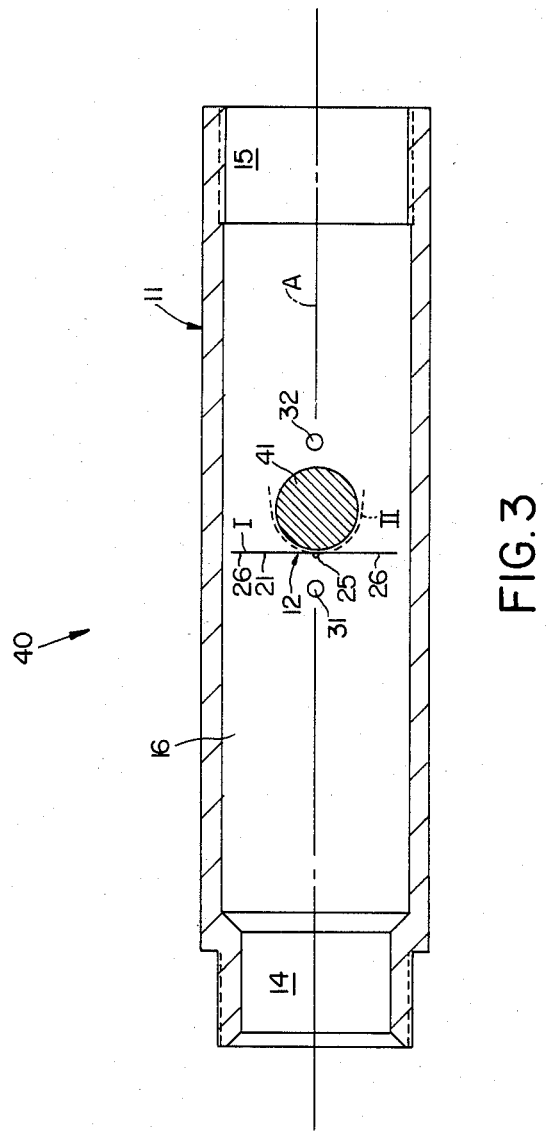
FIG. 3 is a sectional bottom view of a second exemplary flow sensing device embodying the invention.

A second exemplary flow sensing device 40 is shown in FIG. 3. It is similar to the first exemplary flow sensing device 10 except that a larger pin 41 serves as both the mounting pin 24 and the U-shaped rigid member 20 of the first exemplary flow sensing device 10. The larger pin 41 may have any suitable configuration with an upstream surface sufficient to limit the curvature of the flexible member 21 to a value which will delay failure due to fatigue caused by flexing. For example, in the second exemplary flow sensing device 40, the larger pin 41 has a circular cross section with a large enough diameter to limit the minimum bend radius of the flexible disc member 21, delaying fatigue. The center of the flexible member 21 may be mounted directly the pin 41, for example, by means of the staple 25, the wings 26 remaining free to flex between an initial position I normal to the direction of flow and a final position II adjacent much of the upstream surface of the pin 41.

The preferred mode of operation of both exemplary flow sensing devices 10, 40 is similar. For example, the first exemplary flow sensing device 10 may be installed in a hydraulic or pneumatic system by means of the threaded fittings on the inlet 14 and the outlet 15. Fluid flowing from the inlet 14 to the outlet 15 past the flow obstruction assembly 12 develops a differential pressure within the channel 16. In the exemplary flow sensing device 10, the flow obstruction assembly 12 is mounted in the center of the channel 16 and forces the fluid toward the periphery of the channel 16. This not only limits stress on the flexible member 21 but also allows for higher flows in a specific envelope at an equal pressure drop than conventional orifice devices.

For low flows, the wings 26 of the flexible member 21 flex elastically downstream from the initial position I. The effective flow area around the flow obstruction assembly 12 increases as the wings 26 flex from the initial position I toward, the final position II at some predetermined flow velocity, attaining a maximum at the final position II. Further, the force required to elastically flex the wings 26 increases with the magnitude of flexion from the initial position I. Consequently, at low flows, the exemplary flow sensing device 10 acts as a variable area flow sensor in which small changes in flow produce easily detectable changes in differential pressure, allowing very low flows to be accurately sensed. The low end of the useful flow range is defined at least in part by the effective flow area with the flexible member in the initial position I, e.g., as determined by the diameter of the flexible disc member 21, and by the modulus of elasticity of the flexible member, e.g., as determined by the thickness of the flexible disc member.

For high flows, the wings 26 are maintained in the final position II adjacent the legs 23 of the rigid member 20. The rigid member 20 not only limits the minimum bend radius of the wings 26 but also dampens any flutter or angular distortion which may be caused, for example, by tubulent flow, flow surges, or fluid hammer. Unlike the first exemplary flow sensing device 10, the end portions of the wings 26 of the second exemplary flow sensing device 40 extend beyond the pin 41. Thus, the second exemplary flow sensing device 40 may be more susceptible to flutter but is also more easily and less expensively manufactured. Nonetheless, at high flows, both exemplary flow sensing devices 10, 40 act as a variable head flow sensor, allowing high flows to be accurately sensed. Since a flow sensing device according to the present invention acts as a variable area flow sensor at low flows and a variable head flow sensor at high flows, it is anticipated that the flow sensing device may have a useful flow range of about 500 to 1.

The differential pressures developed by flow past the flow obstruction assembly 12 are communicated to the pressure transducer 30 by means of the first and second apertures 31, 32. With the second aperture 32 in the preferred location slightly behind and in line with the pin 24, it is protected from eddy currents which may be caused by the pin 24 or the rigid member 20. In response to the differential pressure, the pressure transducer 30 generates an electrical signal proportional to the differential pressure. This electrical signal may be supplied to a mechanism which correlates the signal to the flow and displays the flow, such as the microprocessor 33 and display 34 shown in FIG. 1.

Although the present invention has been described in terms of two exemplary embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention as defined by the claims.

I claim:

1. A flow sensing device comprising a housing having an inlet and an outlet and defining a fluid flow channel between the inlet and the outlet, a flow obstruction assembly mounted to the housing and including a first member disposed in the fluid flow channel and having at least one rigid portion and a second member disposed in the fluid flow channel upstream from the first member and having at least one flexible portion, said flexible portion being elastically flexible between a first portion in which the second member is generally spaced from the rigid portion and the periphery of the second member is generally spaced from the periphery of the channel to define a first fluid flow area when no fluid is flowing in the channel and a second position in which the second member is generally adjacent the rigid portion and the periphery of the second member is generally spaced from the periphery of the channel to define a second fluid flow area larger than said first fluid flow area when fluid is flowing in the channel at a velocity greater than a predetermined velocity, and means operatively associated with the housing for communicating first and second fluid pressures at first and second locations upstream and downstream of the flow obstruction assembly, respectively, whereby the differential pressure resulting from fluid flow past the flow obstruction assembly may be sensed.

2. The device of claim 1 wherein the flexible portion in the initial position lies generally normal to the direction of flow.

3. The device of claim 1 wherein the second member is attached to the first member.

4. The device of claim 1 wherein the rigid member includes means for limiting the curvature of the flexible member in the final position whereby failure due to fatigue of the flexible member is delayed.

5. The flow sensing device of claim 1 wherein the flow obstruction assembly is mounted to the housing symmetrically in the center of the fluid flow channel whereby fluid flowing past the flow obstruction assembly is forced to the periphery of the channel.

6. The flow sensing device of claim 5 wherein the rigid portion of the first member lies generally oblique to the direction of flow and wherein the flexible portion of the second member in the initial position lies generally normal to the direction of flow.

7. The flow sensing device of claim 1 wherein the pressure communicating means includes a first aperture disposed in the housing upstream from the second member and a second aperture disposed in the housing downstream from the first member.

8. A flow sensing device comprising a housing having an inlet and an outlet and defining a fluid flow channel between the inlet and the outlet, a flow obstruction assembly mounted to the housing and including a generally U-shaped rigid member symmetrically mounted in the center of the housing, said U-shaped rigid member having a bight portion lying generally normal to the direction of flow and first and second leg portions extending downstream from the bight portion in a direction generally oblique to the direction of flow, and a flexible member attached to the bight portion of the U-shaped rigid member, said flexible member being mounted symmetrically within the channel generally normal to the direction of flow with the periphery of the flexible member spaced from the periphery of the channel, and means associated with the housing for communicating first and second pressures upstream and downstream from the flow obstruction assembly, respectively, whereby the differential pressure resulting from fluid flow past the flow obstruction assembly may be sensed.

9. The flow sensing device of claim 8 wherein the bight portion of the U-shaped rigid member and the axis of the flow channel intersect and define a plane and wherein the pressure communicating means includes first and second apertures disposed upstream from the flexible member and downstream from the bight portion of the U-shaped rigid member, respectively, each aperture extending along the defined plane through the same side of the housing.

10. The flow sensing device of claim 8 wherein the flow obstruction assembly further includes a pin fixed to the housing and extending perpendicularly through the center of the channel downstream from the bight portion of the U-shaped rigid member, said pin being attached to the bight portion.

11. The flow sensing device of claim 8 further comprising a differential pressure transducer mounted to the housing and operatively associated with the pressure communicating means for generating an electronic signal corresponding to the differential pressure and means responsive to the electronic signal for indicating the flow.

12. The flow sensing device of claim 8 wherein the channel has a generally circular cross section and wherein the flexible member comprises a flexible disc member with a diameter smaller than the diameter of the channel.

13. A flow sensing device comprising a housing having an inlet and an outlet and defining a fluid flow channel between the inlet and the outlet, a flow obstruction assembly mounted to the housing and including a rigid pin member extending perpendicularly through the center of the channel and joined at both ends to the housing, and a flexible member mounted to the rigid pin member symmetrically within the channel, at least a portion of the flexible member being elastically flexible between an initial position spaced from the rigid pin member and a final position adjacent the rigid pin member, said pin member including means for limiting the curvature of the flexible member in the final position whereby failure due to fatigue of the flexible member is delayed, and means associated with the housing for communicating first and second pressures upstream and downstream from the flow obstruction assembly, respectively, whereby the differential pressure resulting from fluid flow past the flow obstruction assembly may be sensed.

14. The flow sensing device of claim 13 wherein the axis of the rigid pin member and the axis of the flow channel intersect and define a plane and wherein the pressure communicating means includes first and second apertures disposed upstream from the flexible member and downstream from the rigid pin member, respectively, each aperture extending along the defined plane and through the same side of the housing.

15. The flow sensing device of claim 13 further comprising a differential pressure transducer mounted to the housing and operatively associated with the pressure communicating means for generating an electronic signal corresponging to the differential pressure and means responsive to the electronic signal for indicating the flow.

16. The flow sensing device of claim 13 wherein the channel has a generally circular cross section and wherein the flexible member comprises a flexible disc member with a diameter smaller than the diameter of the channel.

* * * * *